United States Patent [19]

Shirota

[11] Patent Number: 5,394,552
[45] Date of Patent: Feb. 28, 1995

[54] DOCKING SYSTEM FOR ENHANCING COMPUTER FUNCTIONALITY

[75] Inventor: Hironao Shirota, Suwa, Japan
[73] Assignee: Seiko Epson Corp., Tokyo, Japan
[21] Appl. No.: 910,275
[22] PCT Filed: Nov. 19, 1991
[86] PCT No.: PCT/JP91/01589
§ 371 Date: Jul. 17, 1992
§ 102(e) Date: Jul. 17, 1992
[87] PCT Pub. No.: WO92/09026
PCT Pub. Date: May 29, 1992

[30] Foreign Application Priority Data

Nov. 19, 1990 [JP] Japan ................. 2-313158
Nov. 19, 1990 [JP] Japan ................. 2-313159

[51] Int. Cl.⁶ ............................................. G06F 3/00
[52] U.S. Cl. ........................... 395/750; 364/DIG. 1; 364/273; 307/23
[58] Field of Search ............... 395/750, 325; 364/708, 364/707, 550; 371/66; 307/22, 23

[56] References Cited

U.S. PATENT DOCUMENTS

| | | | |
|---|---|---|---|
| 4,486,759 | 12/1984 | Toyomura | 346/76 |
| 4,698,530 | 10/1987 | Thomson | 307/571 |
| 4,769,764 | 9/1988 | Levanon | 364/708 |
| 4,782,355 | 11/1988 | Sakai et al. | 395/750 |
| 4,817,049 | 3/1989 | Bates et al. | 395/750 |
| 4,841,474 | 6/1989 | Zandveld et al. | 371/66 |
| 4,951,235 | 8/1990 | Mori | 364/550 |
| 5,008,846 | 4/1991 | Inoue | 364/707 |
| 5,030,128 | 7/1991 | Herron et al. | 364/700 |
| 5,058,045 | 10/1991 | Ma | 364/708 |
| 5,128,863 | 7/1992 | Nakamura et al. | 371/66 |
| 5,140,183 | 8/1992 | Takenaka | 307/296.4 |
| 5,151,907 | 9/1992 | Robbins | 371/66 |
| 5,237,487 | 8/1993 | Dittmer et al. | 361/729 |
| 5,265,238 | 11/1993 | Canova, Jr. et al. | 395/325 |
| 5,280,398 | 1/1994 | Wade et al. | 360/60 |

FOREIGN PATENT DOCUMENTS 60-132220 7/1985 Japan .

*Primary Examiner*—Jack B. Harvey
*Assistant Examiner*—Ayaz R. Sheikh
*Attorney, Agent, or Firm*—Spensley Horn Jubas & Lubitz

[57] ABSTRACT

A docking system comprising a first detecting element 13 which detects combination states of a personal computer 2 and a station 1. A second detecting element 14 is provided which detects a separation of the personal computer 2 from the station 1. The docking system also includes a combination holding element for holding a combination state of the personal computer side connector 33 and the station side connector 12. Furthermore, the docking system includes a switching element 32 for switching the personal computer side electric power source 39 to the station side electric power source 18. A third detecting element 34 is provided which detects placement of the personal computer 2 on the station 1. A control unit is provided which has three functions. First, it cuts the personal computer side electric power source 39 after performing backup processing of an execution program under a first set of predetermined conditions. Second, it supplies electric power from the station side electric power source 18 to the personal computer 2 by switching element 32 under a second set of predetermined conditions. Third, it cuts the electric power source under a third set of predetermined conditions. Each set of conditions is determined by the detecting elements.

16 Claims, 16 Drawing Sheets

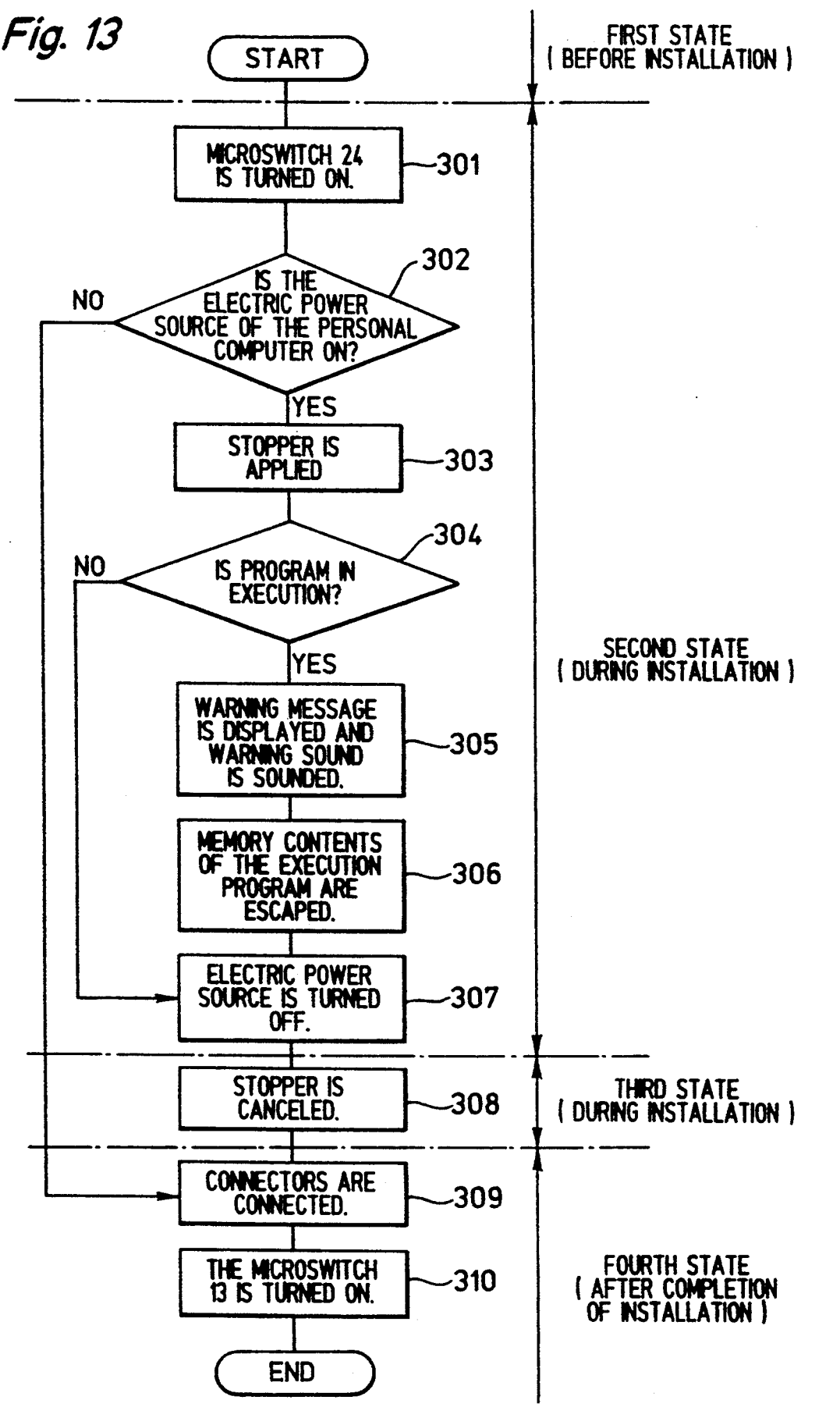

DOCKING SYSTEM FOR ENHANCING COMPUTER FUNCTIONALITY

TECHNICAL FIELD

The present invention relates to a docking system constituted by a station which extends ability or enhances performance of a personal computer and the personal computer mounted upon this station.

BACKGROUND ART

A station for extending functions has been hitherto utilized. This station can be mounted with an extension board and a floppy disk unit/a hard disk unit, which can extend ability or enhance performance of a personal computer of the notebook type by connecting it with the notebook type personal computer.

By the way, when a personal computer of the notebook type is mounted on this station, it is necessary that an electric power source at the notebook type personal computer side is infallibly cut off. If the station is connected with the notebook type personal computer of which the electric power source is turned on, such problems as data of a program during execution become extinct, or IC is destroyed due to difference in voltage between a contained battery of the notebook type personal computer and a domestic electric power source of the notebook type personal computer. In addition, the same problems also take place when the notebook type personal computer is separated from the station in a state in which the electric power source is turned on.

DISCLOSURE OF INVENTION

In order to solve the above problems, the present invention comprises a first detecting means for detecting combination states of the personal computer and said station, a second detecting means for detecting separating operation of the personal computer from the station, a combination holding means for holding a combination state of said personal computer side connector and the station side connector, a switching means for switching the personal computer side electric power source portion to the station side electric power source portion, a third detecting means for detecting a state of placement of said personal computer on the station, and a control unit which cuts the personal computer side electric power source after performing backup processing at an execution program when the personal computer side electric power source portion is in a conductive state when the third detecting means detects a state of placement, supplies electric power from the station side electric power source portion to the personal computer by means of the switching means when the first detecting means detects a state of the station the connector being combined with the personal computer side connector, and cuts the electric power source after performing backup processing of an execution program when the personal computer is in an actuation state when the second detecting means detects separating operation of said personal computer.

According to the docking system of the present invention, when the personal computer side electric power source portion is in a conductive state when the personal computer is placed on the station, then it investigates whether the program is executed or not. And when the program is executed, the backup processing of the execution program is performed, and thereafter the electric power source is cut off.

BEST MODE FOR CARRYING OUT THE INVENTION

Figure 1:
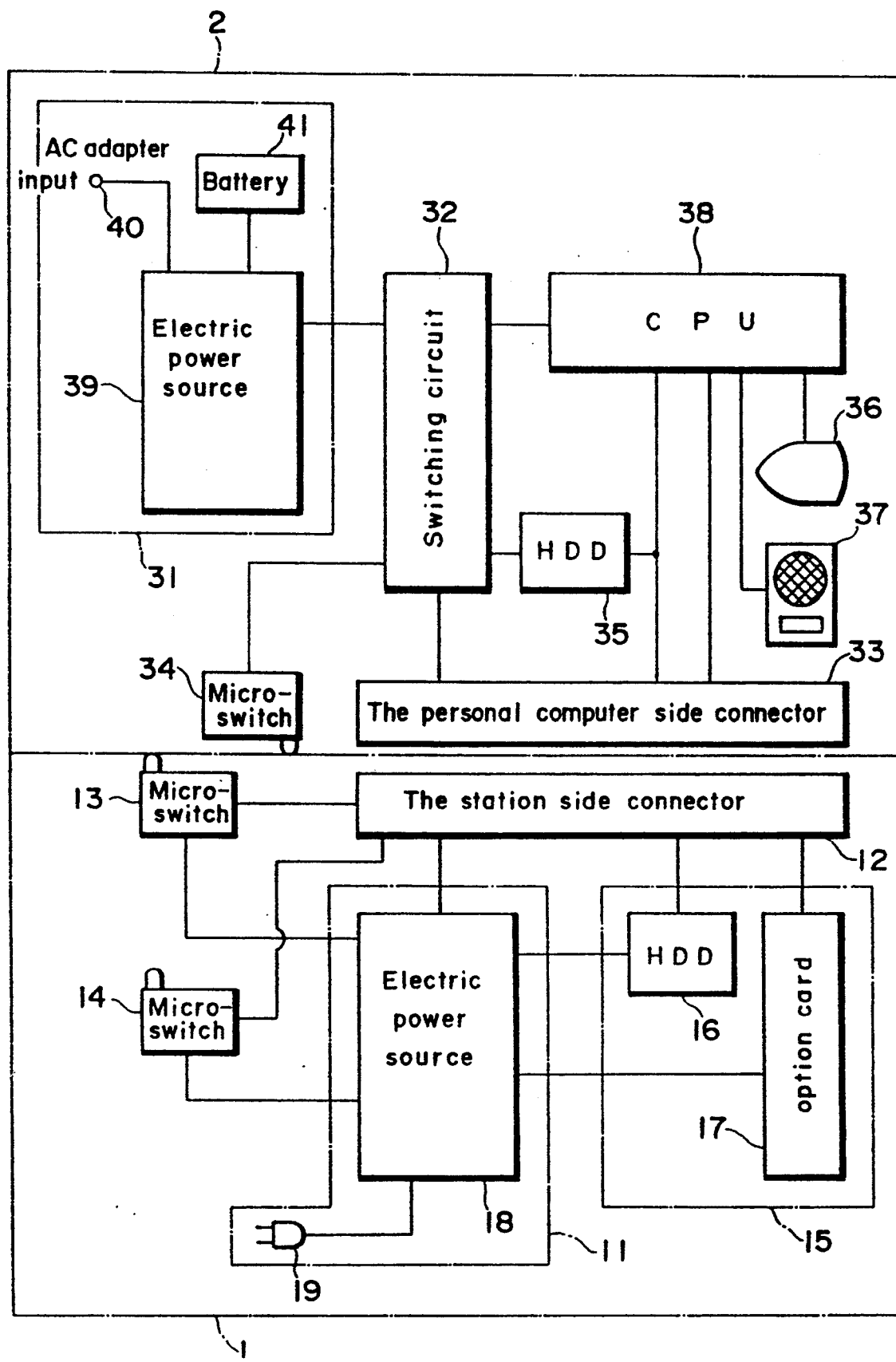
FIG. 1 is a block diagram of the first embodiment of the docking system according to the present invention.

An example of a docking system according to the present invention will be explained on the basis of FIG. 1. FIG. 1 is a block diagram showing the docking system. The docking system is constituted by a station 1 and a personal computer 2. The station 1 is provided with an electric power source portion 11 for supplying electric power to the personal computer 2 and the station 1, a station side connector 12 for electrically combining the personal computer 2 with the station 1, a microswitch 13 which is the first detecting means, a microswitch 14 which is the second detecting means, and an option portion 15. This option portion 15 is provided with a hard disk drive 16 and an option card 17. In addition, the electric power source portion 11 is provided with an electric power unit 18 and an input terminal for a domestic electric power source 19.

The personal computer 2 is provided with an electric power source portion 31 for supplying electric power to the personal computer 2, a switching circuit 32 for switching the supply source of electric power, a personal computer side connector 33 for electrically combining the personal computer 2 with the station 1, a microswitch 34 which is the third detecting means, a hard disk drive 35 in which a program is stored, a display unit 36 for displaying a message, a speaker 37 from which a buzzer sound is output, and a control unit 38 for controlling these units. In addition, the electric power source portion 31 is provided with an electric power source unit 39, an adapter input terminal for a domestic electric power source 40, and a battery 41.

And depending on conditions of installation of the personal computer 2 on the station 1, on/off of the microswitch 13, 14 and 34 changes. Using this change of each of the microswitches as an input signal which is detected by the control unit 38, switching control of the electric power source portion 39 of the personal computer 2 and the like is performed.

Figure 2:
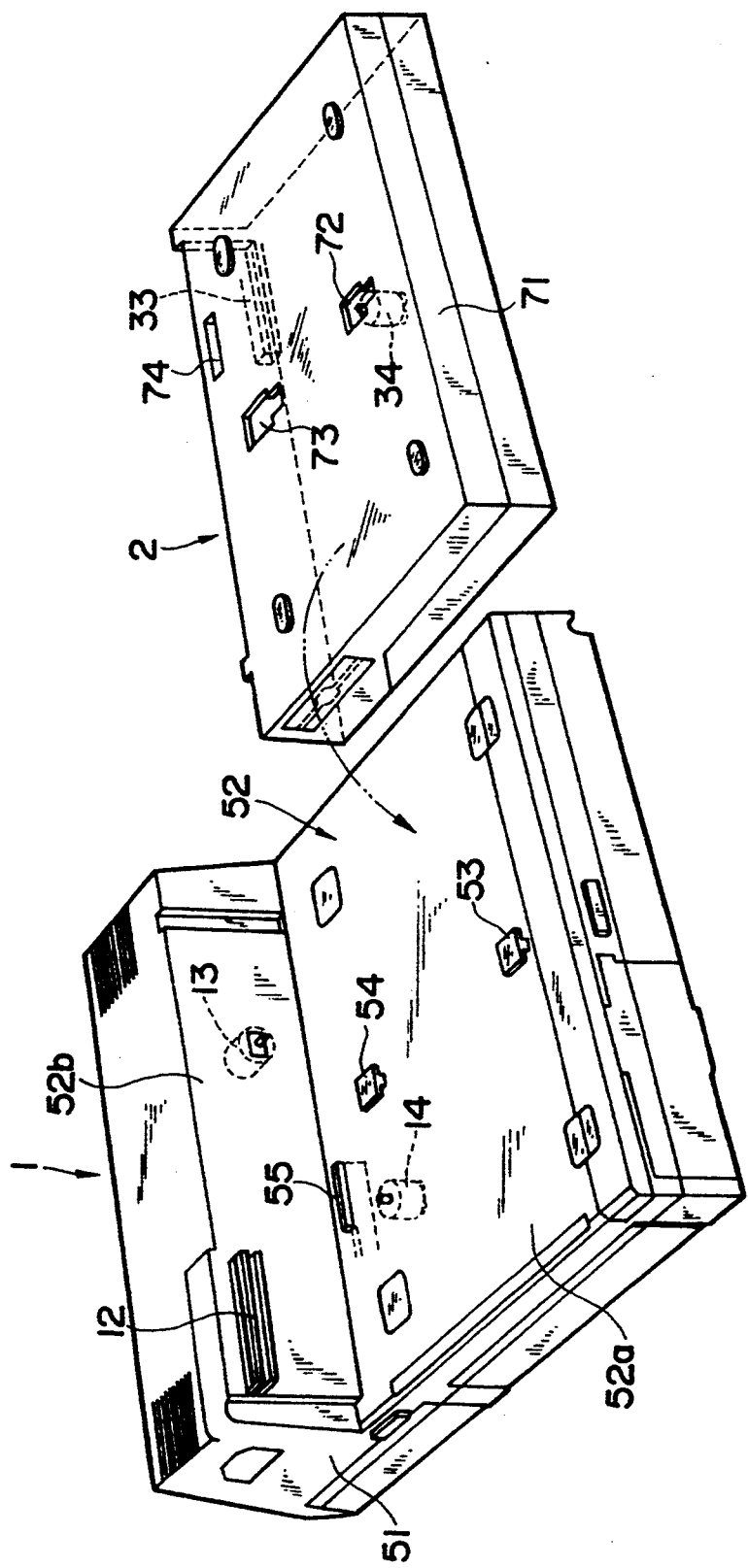
FIG. 2 is a perspective view of a state in which the personal computer is separated from the station.
Figure 3:
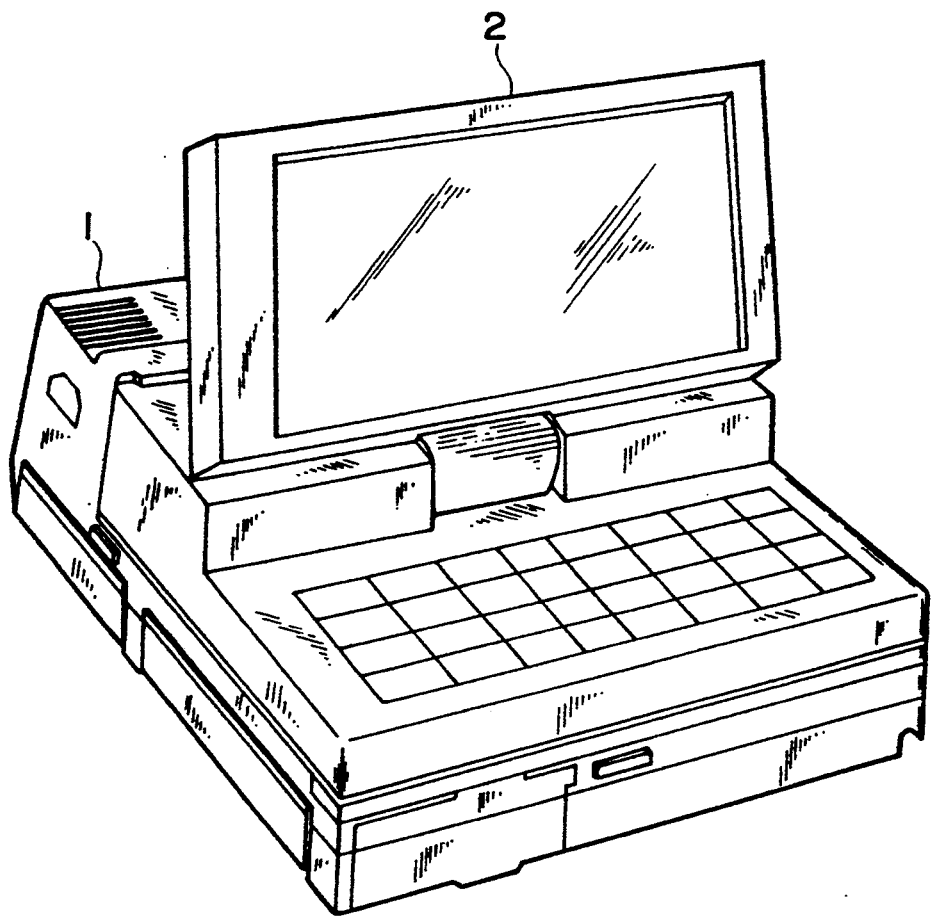
FIG. 3 is a total perspective view of the docking system in which the present invention is carried out, FIG. 4 consist of FIGS. 4A–4C is cross-sectional views showing a procedure for mounting the personal computer on the station.

Next, using FIG. 2 and FIG. 3, an external construction of the docking system will be explained. FIG. 2 is a perspective view of a state in which the personal computer is separated from the station and turned over, and FIG. 3 is a perspective view of a state in which the personal computer is mounted on the station.

As shown in both figures, the cross section of station 1 is formed in the shape of a character "L", and the personal computer 2 is mounted in the depth of the character "L" to provide a box type docking system as a whole. The station 1 is provided at the upper surface of its case 51 with a mounting portion 52 which has a mounting surface 52a having the same width as the personal computer 2 and a mounting wall 52b having the same height, and in the inside of the case 51 are contained an electric power source unit, a hard disk drive, an extension unit, an IC card and the like (any one of which is not shown in the figures). This allows the station 1 to extend performance of the personal computer 2 mounted thereon or enhance its performance, thereby a high function equal to that of an ordinary desk-top personal computer can be realized.

On the other hand, the personal computer 2 is portable, and inside of a case 71 thereof are contained minimum functions such as an electric power source unit, a floppy disk drive and the like (any one of which is not shown in the figures), so that it functions as a so-called lap-top personal computer. Therefore, when the personal computer 2 is docked with the station 1 so as to be used as a docking system shown in FIG. 3, it is necessary to electrically connect both. Thus, as shown in FIG. 2, at the mounting wall 52b, the station 1 is provided with a station side connector 12 and at the rear end surface the personal computer 2 is provided with a personal computer side connector 33. The personal computer 2 is placed on the mounting portion 52 of the station 1, and by pushing it forward the station side connector 12 is connected electrically with the personal computer side connector 33. Namely, with respect to the station 1, the personal computer 2 can slide between a position where it is placed and a position where connecters are connected. After the sliding movement to connect the connectors of the both, it is necessary that they are reliably fixed. Thus, on the installing surface 52a of the station 1 are provided guiding projections 53, 54 and a fastening member 55, and at the rear surface of the personal computer 2 are provided guiding grooves 72, 73 corresponding to the guiding projections 53, 54 and a fastening member receiver 74 corresponding to the fastening member 55. And by the fastening member 55 of the station 1 being fastened to the fastening member receiver 74 of the personal computer 2 at a position where the connecters are connected, both connectors are reliably fixed. Further, the microswitch 13 provided at the installing wall 52b, becomes ON state when the personal computer 2 slides on the station 1 to allow the connecters to be connected. In addition, the microswitch 14 provided at a lower portion of the fastening member 55 becomes ON state when the fastening member 55 is pushed downward to release the lock of the connector. Further, the microswitch 34 provided at a lower portion of the guiding groove 72, becomes ON state when the personal computer 2 is placed on the station 1.

Figure 4A:
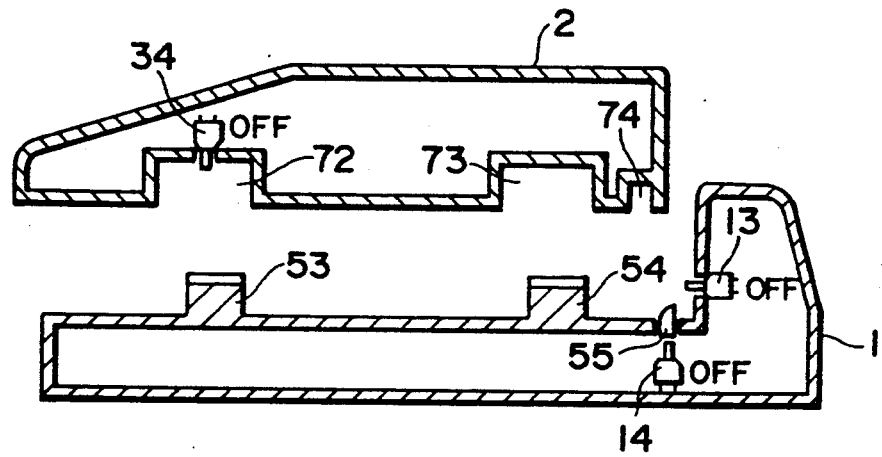
Figure 4B:
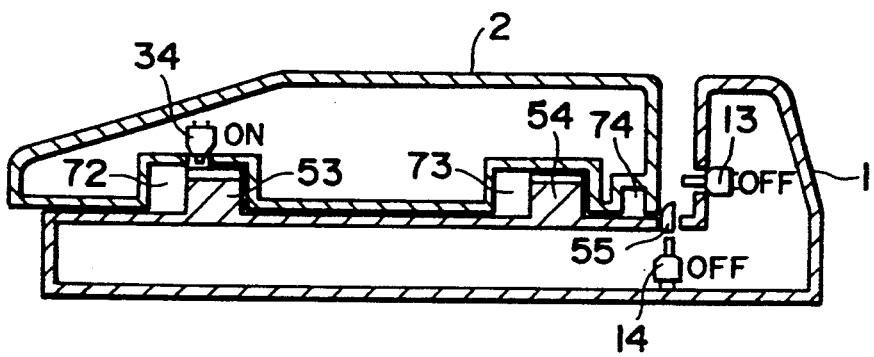
Figure 4C:
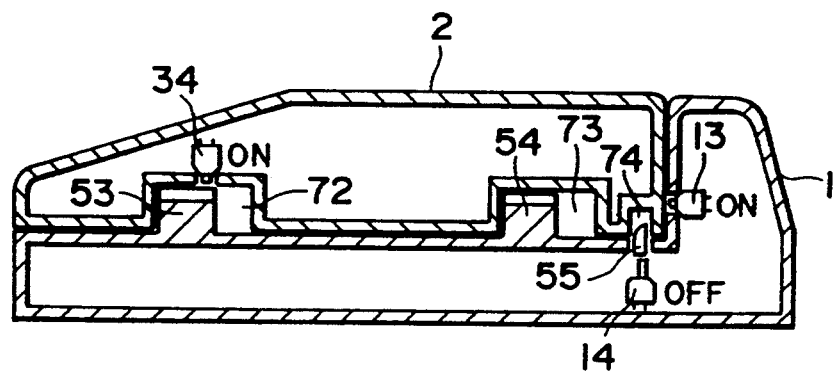
Figure 5:
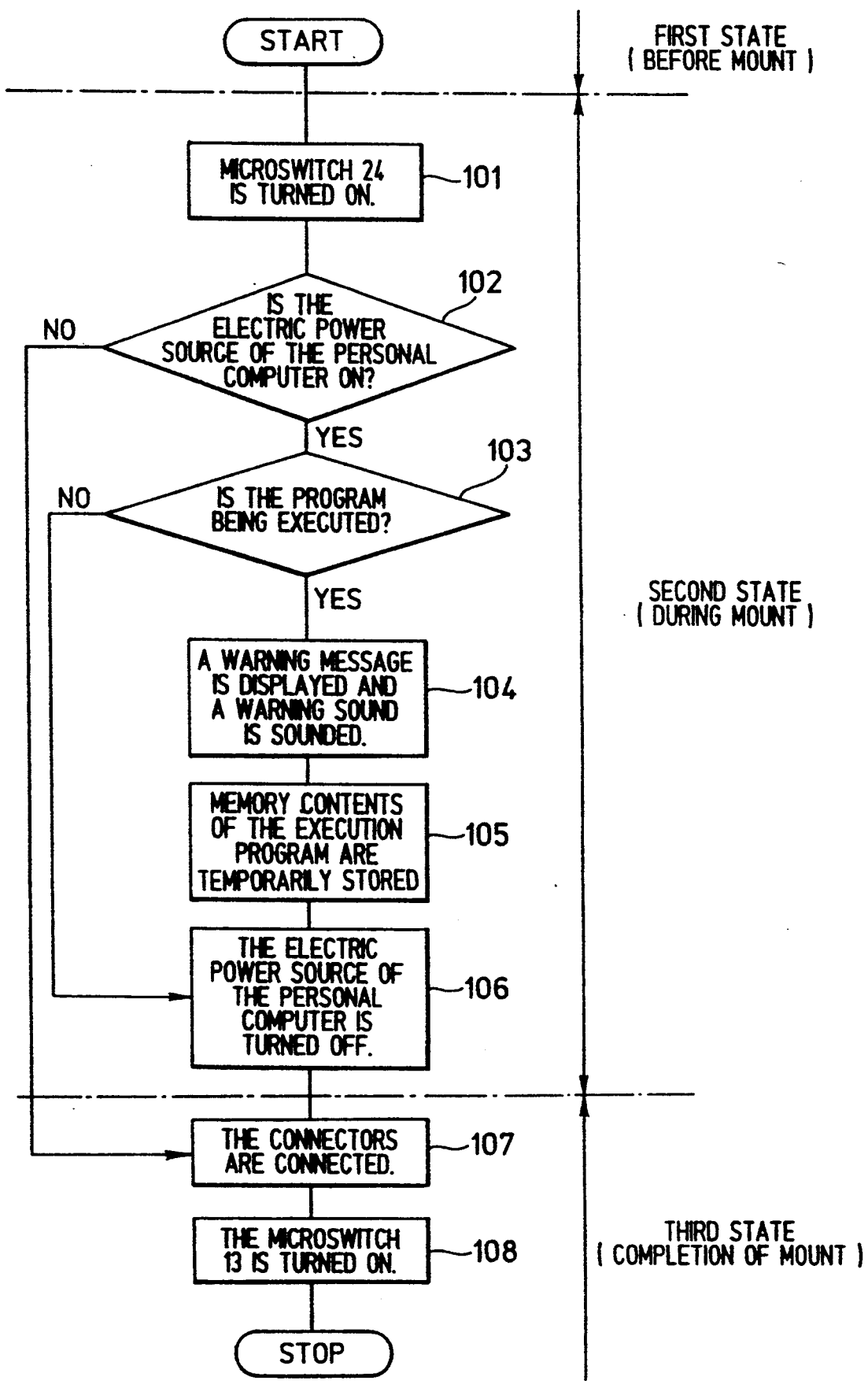
FIG. 5 is a flowchart showing a procedure for mounting the personal computer on the station, FIG. 6 consist of FIGS. 6A–6D is cross-sectional views showing a procedure for separating the personal computer from the station.

Next, using FIG. 4 to FIG. 7, switching and disconnecting actions of the electric sources when the personal computer 2 is mounted onto the station 1 and when the personal computer is separated from the station 1 will be described. FIG. 4(a) to (c) are cross-sectional views showing a procedure for mounting the personal computer 2 onto the station 1, and FIG. 5 is a flowchart of a procedure for placing the personal computer 2 onto the station 1. At first, in the first state shown in FIG. 4(a), the personal computer 2 has not been placed on the station 1 yet. In this state, both of the microswitches 13, 14 provided at the station are in a state of OFF. Also the microswitch 34 provided at the personal computer 2 is in a state of OFF. Next, in the second state shown in FIG. 4(b), the personal computer 2 is placed on the station 1. In this state, both of the microswitches 13, 14 provided at the station 1 are in a state of OFF, and the microswitch 34 provided at the personal computer 2 is switched to a state of ON (step 101). At the time this microswitch 34 has been switched to the state of ON, when the electric power source of the personal computer 2 is turned on, an input signal of this microswitch 34 is detected by the control unit 38 (step 102). Using this input signal, the control unit 38 investigates whether the program is being executed or not (step 103), and when being executed, a warning message is displayed on the display unit 36 and a warning sound is sounded from the speaker 37 (step 104). And memory contents of the program in execution are temporally stored in a hard disk drive or the like (step 105), and the electric power source of the personal computer 2 is disconnected after completion of all temporal storage (step 106). On the other hand, when the program is not executed when the input signal of the microswitch 34 is detected by the control unit 38, the electric power source of the personal computer 2 is immediately disconnected. Next, in the third state shown in FIG. 4(c), the personal computer 2 slides to connect the station side connector 12 with the personal computer side connector 33 (step 107). This sliding movement switches the microswitch 13 to ON state (step 108). When this input signal is detected by the control unit 38, the switching unit 22 acts to switch the supplying source of the electric power from the electric power source unit 39 at the personal computer side to the electric power source unit 18 at the station side 18. Thereafter, using the electric power from the electric power source unit at the station side 18, the station 1 and the personal computer 2 act in an integrated manner.

Figure 6A:
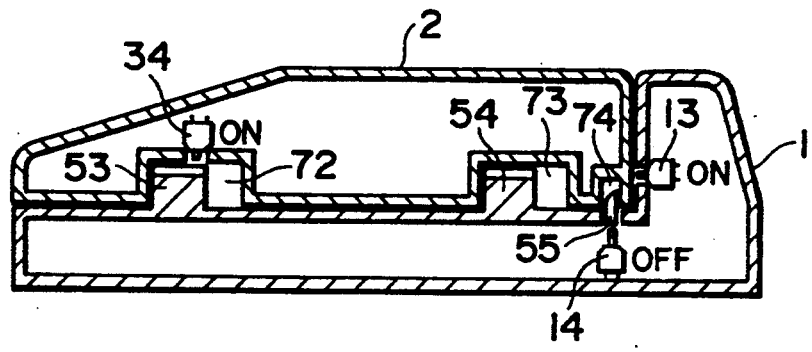
Figure 6B:
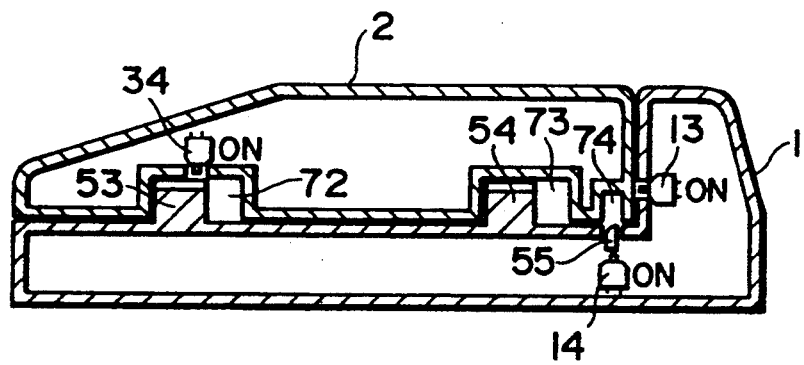
Figure 7:
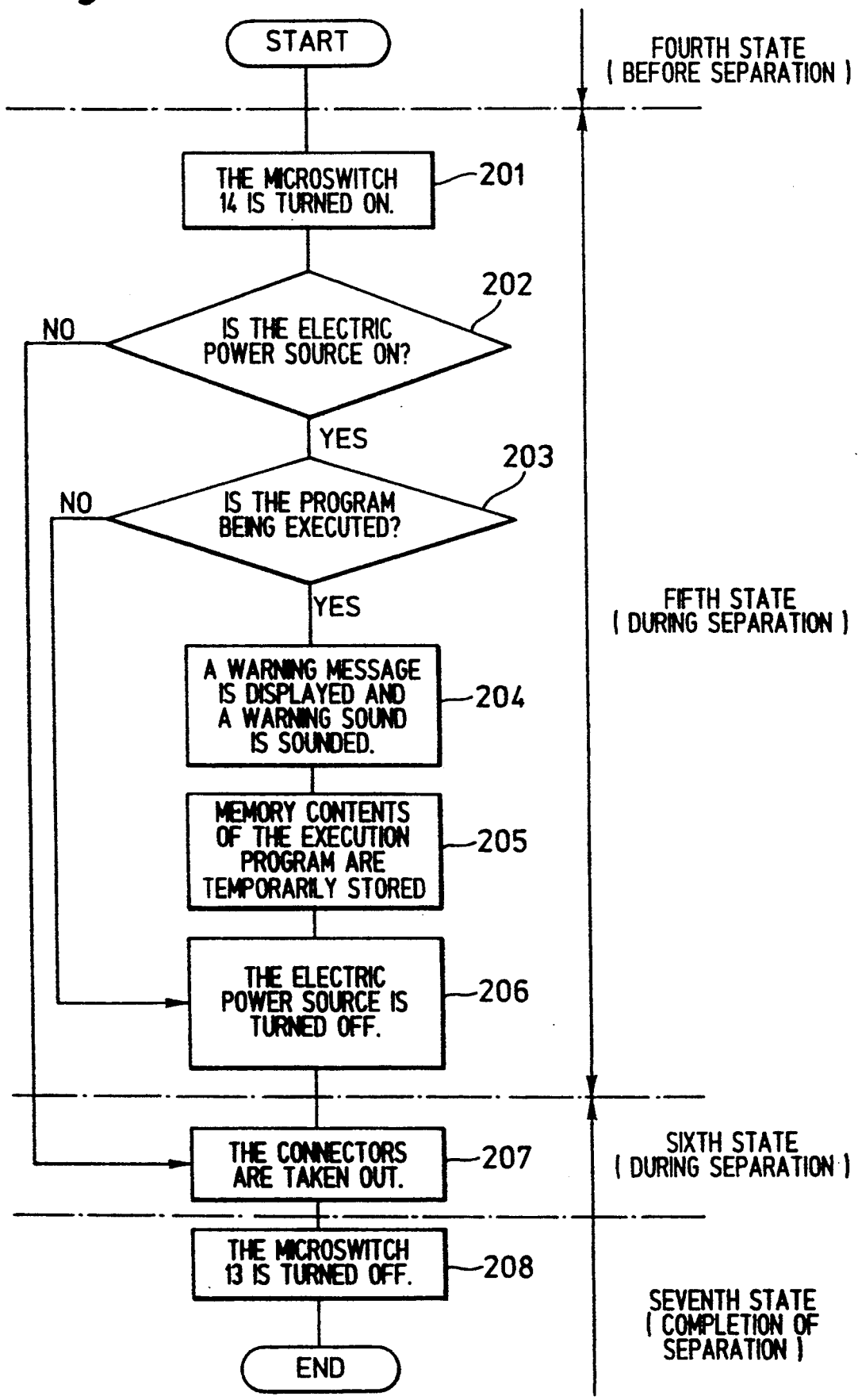
FIG. 7 is a flowchart showing a procedure for separating the personal computer from the station.
Figure 8:
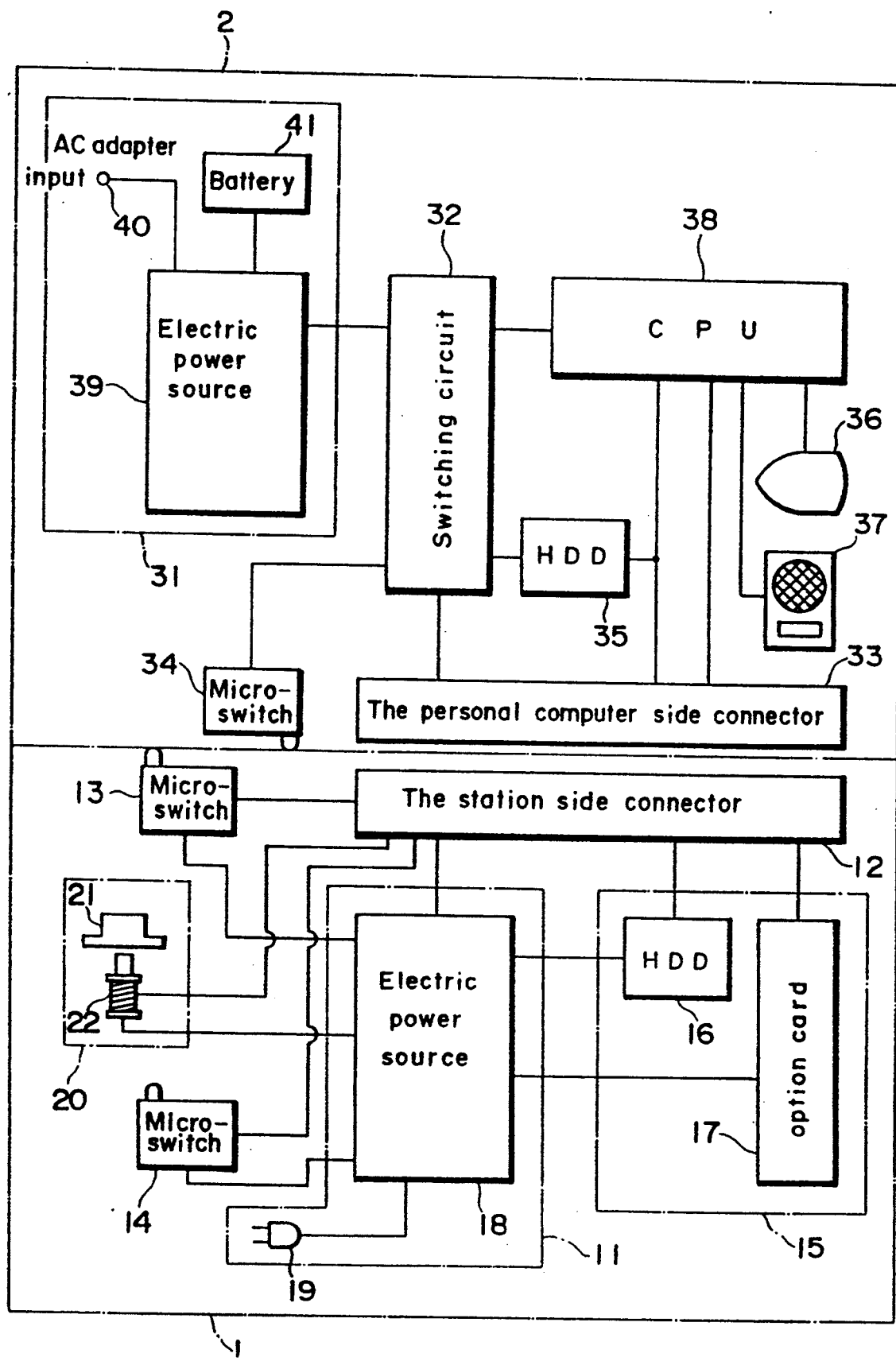
FIG. 8 is a block diagram as the second embodiment of the docking system according to the present invention.
Figure 9:
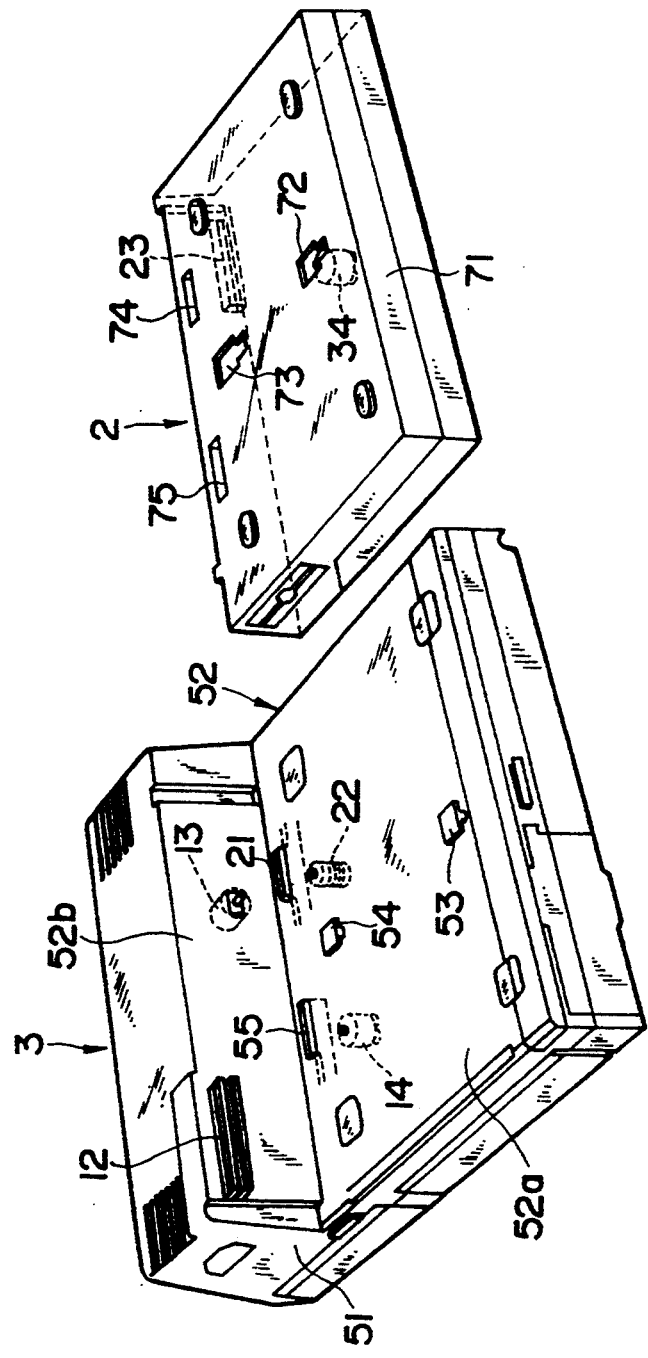
FIG. 9 is a perspective view of a state in which the personal computer is separated from the station.
Figure 10:
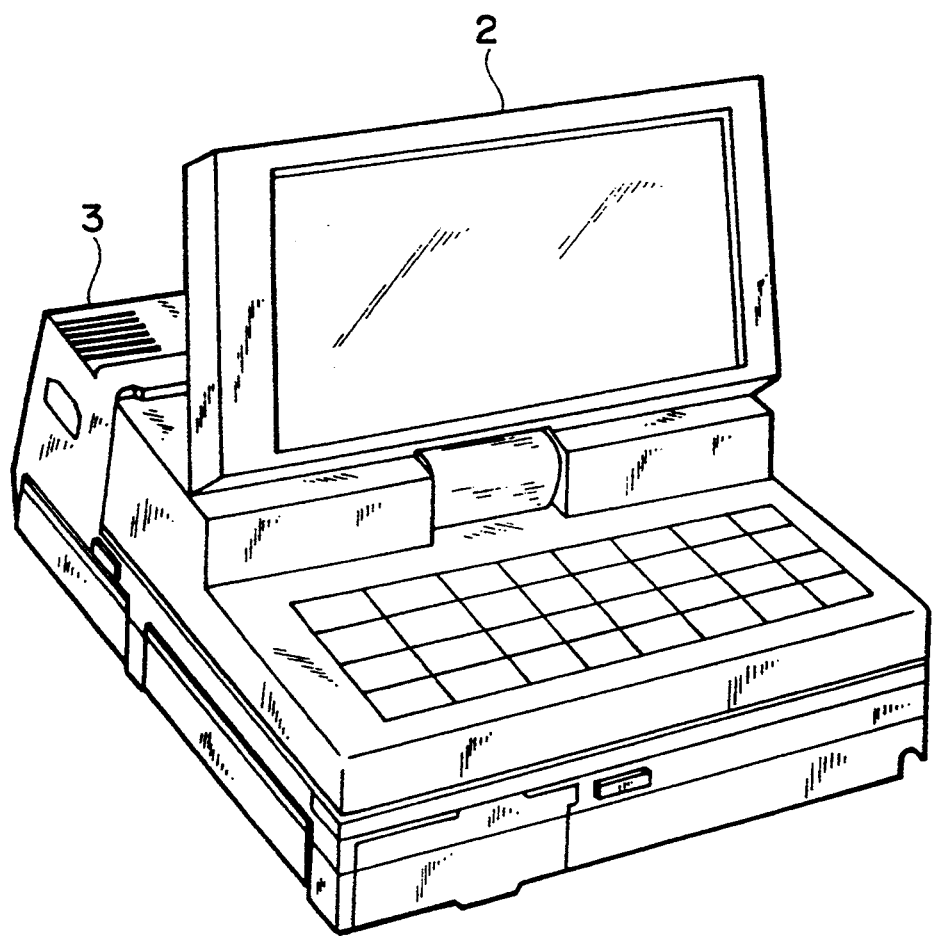
FIG. 10 is a whole perspective view of the docking system in which the present invention is carried out, FIG. 11 consist of FIGS. 11A–11B and FIG. 12 consist of FIGS. 12A–12B are cross-sectional views showing a procedure for mounting the personal computer on the station.

FIG. 6(a) to 6(b) are cross-sectional views showing a procedure in which the personal computer 2 is separated from the station 1, FIG. 7 is a flow chart showing a procedure in which the personal computer 2 is separated from the station 1.

Figure 6C:
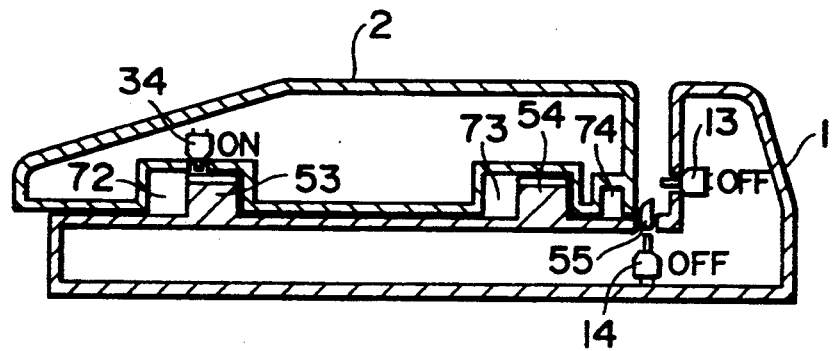
Figure 6D:
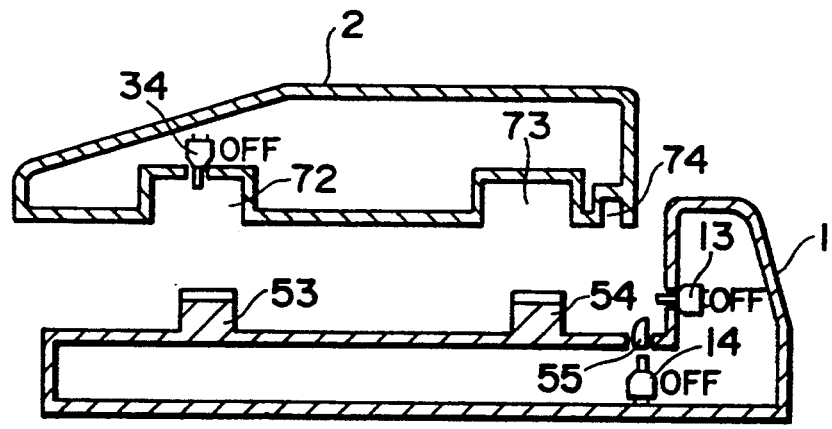

The fourth state shown in FIG. 6(a) is the same as the third state shown in FIG. 4(c). And when proceeding to the fifth state shown in FIG. 6(b), the fastening member 55 is pushed downward to switch the microswitch 14 to ON state (step 201). When the electric power source of the personal computer 2 is turned on when this microswitch 14 is switched to the state of ON, an input signal of this microswitch 14 is detected by the control unit 38 (step 202). The control unit 38 uses this input signal to investigate whether the program is executed by the personal computer 2 or not (step 203), and when being executed, a warning message is displayed on the display unit 36, and a warning sound is sounded from the speaker 37 (step 204). And memory contents of the program in execution are temporally stored into a hard disk drive or the like(step 205), and the electric power source of the personal computer 2 is disconnected after completion of all storage (step 206). On the other hand, when the program is not executed when the input signal of the microswitch 14 is detected by the control unit 38, the electric power source of the personal computer 2 is immediately disconnected. When the sixth state shown in FIG. 6(c) is provided, the station side connecter 12 is separated from the personal computer side connector 33 (step 207). And in the seventh state shown in FIG. 6(d), the personal computer 2 is separated from the station 1. This separating action allows the microswitch 34 to be switched to a state of OFF (step 208).

Next, a docking system as the second embodiment according to the present invention will be explained on the basis of FIGS. 11 to 14. The present embodiment differs from the docking system according to the first embodiment since the present embodiment is provided with a stopper portion 20 which becomes locked in order to prevent or fix electric combination between the personal computer 2 and station 3. The stopper portion 20 has the stopper portion 20 is provided with a fastening member 21 and a solenoid 22. By the control unit 38 detects this change of each of the microswitches making as an input signal, locking control of the stopper portion 20 of the station 1 and the like are performed. Here, if the connectors are connected while the electric power source portion 31 of the personal computer 2 being in a conductive state, IC is destroyed due to voltage difference between the electric power source portion 11 of the station portion 1 and the electric power source portion 31 of the personal computer 2. In addition, when a program is being executed, contents of a memory during execution disappear. Thus, in order not to let the connector to be connected by performing sliding movement when the electric power source portion 31 of the personal computer 2 is in a conductive state, the mounting surface 52a is provided with fastening member 21 and solenoid 22, and the reverse surface of the personal computer 2 is provided with a fastening member receiver 75.

Next, actions of the stopper portion 20 and the electric power source portion at the time of mounting the personal computer 2 onto the station 1 and a separating the personal computer 2 from the station 1 will be described. FIG. 11 and FIG. 12 is a cross-sectional view showing procedural flow in which the personal computer 2 is mounted on the section 1, FIG. 13 is a flow chart showing a process in which the personal computer 2 is mounted on the station 1.

Figure 11A:
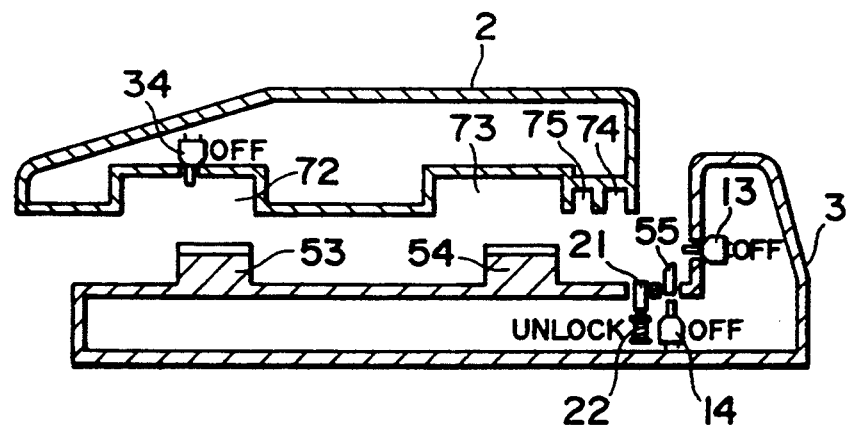
Figure 11B:
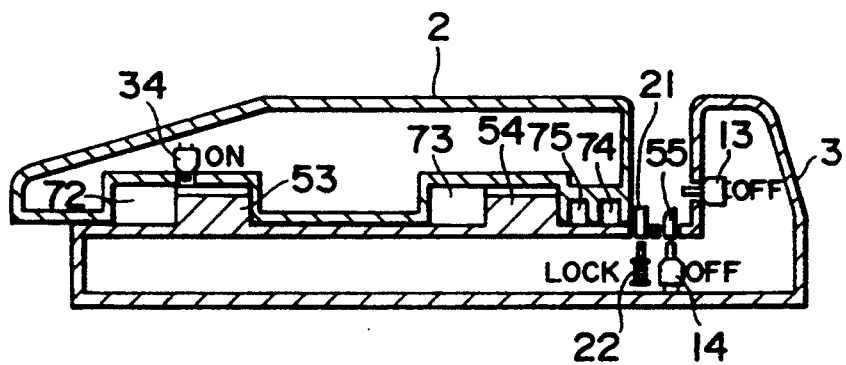
Figure 12A:
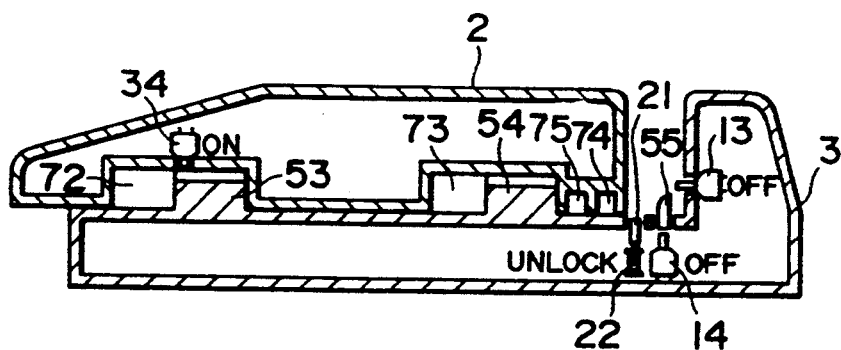
Figure 12B:
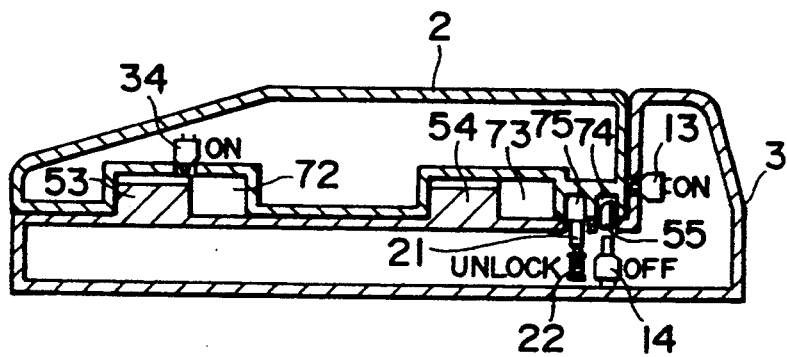

At first, in the first state shown in FIG. 11(a), the personal computer 2 has not been mounted on the station 1 yet. In this state, both of the microswitches 13, 14 provided at the station 1 are in a state of OFF, and the stopper portion is in a locking cancellation state. Also the microswitch 34 provided at the personal computer 2 is in a state of OFF. Next, in the second state as shown in FIG. 11(b), the personal computer 2 is mounted on the station 1. In this state, both of the microswitches 13, 14 provided at the station 1 are in a state of OFF, and the microswitch 34 provided at the personal computer 2 is switched to a state of ON (step 301). When the electric power source of the personal computer 2 is turned on when this microswitch 34 has been switched to the state of ON (step 302), the stopper portion becomes locked (step 303). Next, using an input signal of this microswitch 34, the control unit 38 investigates whether the program is being in execution or not (step 304), and when it is in execution, a warning message is displayed on the display unit 36 and a warning sound is generated from the speaker 37 (step 305). And let the memory contents of the program under execution being temporally stored to a hard disk drive or the like (step 306), and the electric power source of the personal computer 2 is cut after completion of all temporal storage (step 307). On the other hand, in case the program is not under execution when the input signal of the microswitch 34 is detected by the control unit 38, the electric power source of the personal computer 2 is immediately cut. And in the third state shown in FIG. 12(c), the locked state of the stopper portion is canceled (step 308). Next, in the fourth state shown in FIG. 12(d), the personal computer 2 is subjected to sliding movement to connect the station side connector 12 with the personal computer side connector 33 (step 309). This sliding movement allows the microswitch 13 to be switched to a state of ON (step 310). When this input signal is detected by the control unit 38, the switching unit 32 acts to switch the supplying source of the electric power from the electric power source unit at the personal computer side 39 to the electric power source unit at the station side 21. Thereafter, using the electric power from the electric power source unit at the station side 21, the station 1 and the personal computer 2 act in an integrated manner.

Figure 14A:
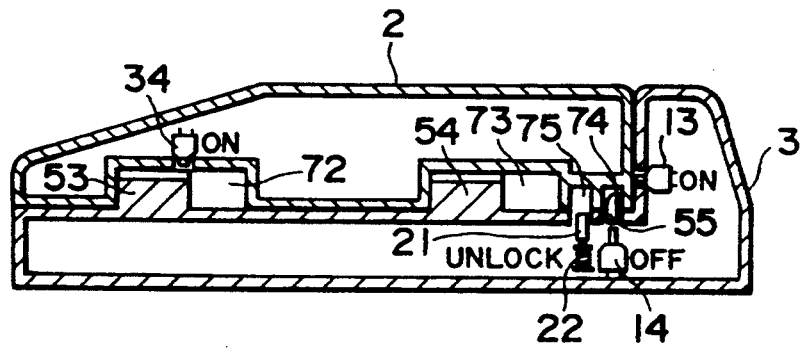
FIG. 14 is a flowchart showing a procedure for mounting the personal computer on the station, FIG. 14 consist of FIGS. 14A–14C and FIG. 15 consist of FIGS. 15A–15B are cross-sectional views showing a procedure for separating the personal computer from the station.
Figure 14B:
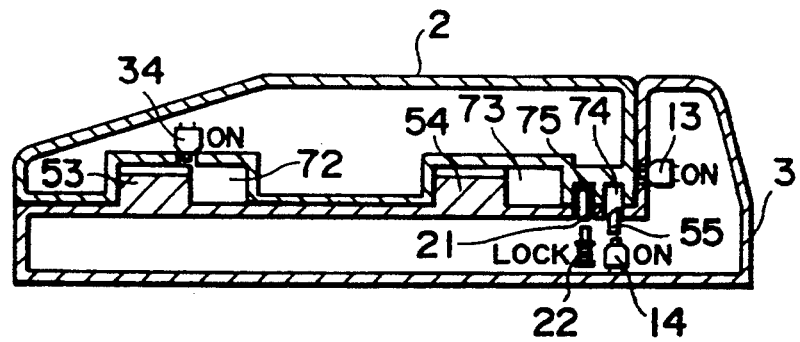
Figure 14C:
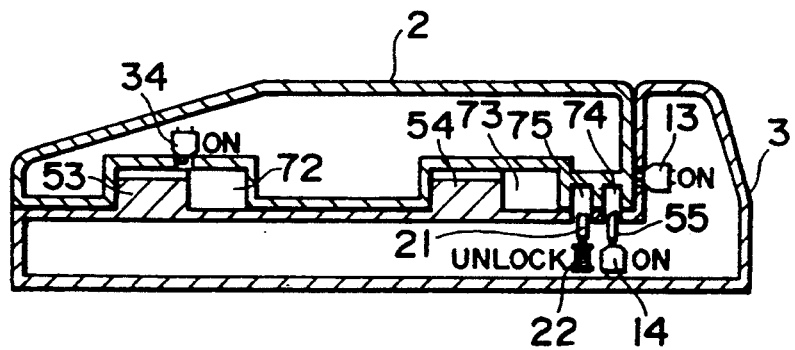
Figure 15A:
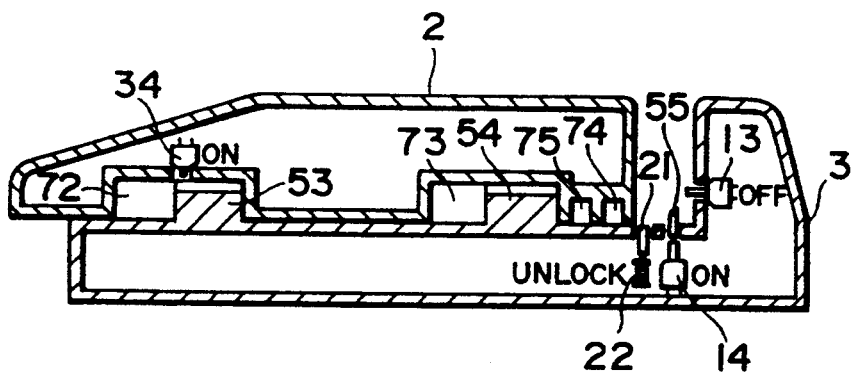
Figure 15B:
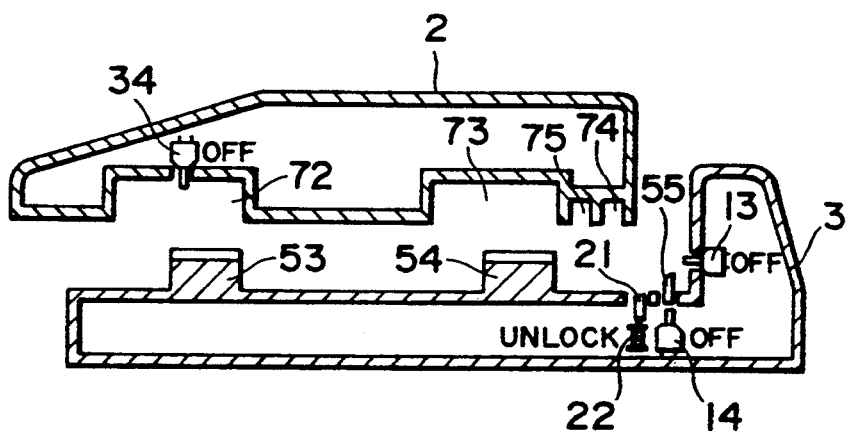
Figure 16:
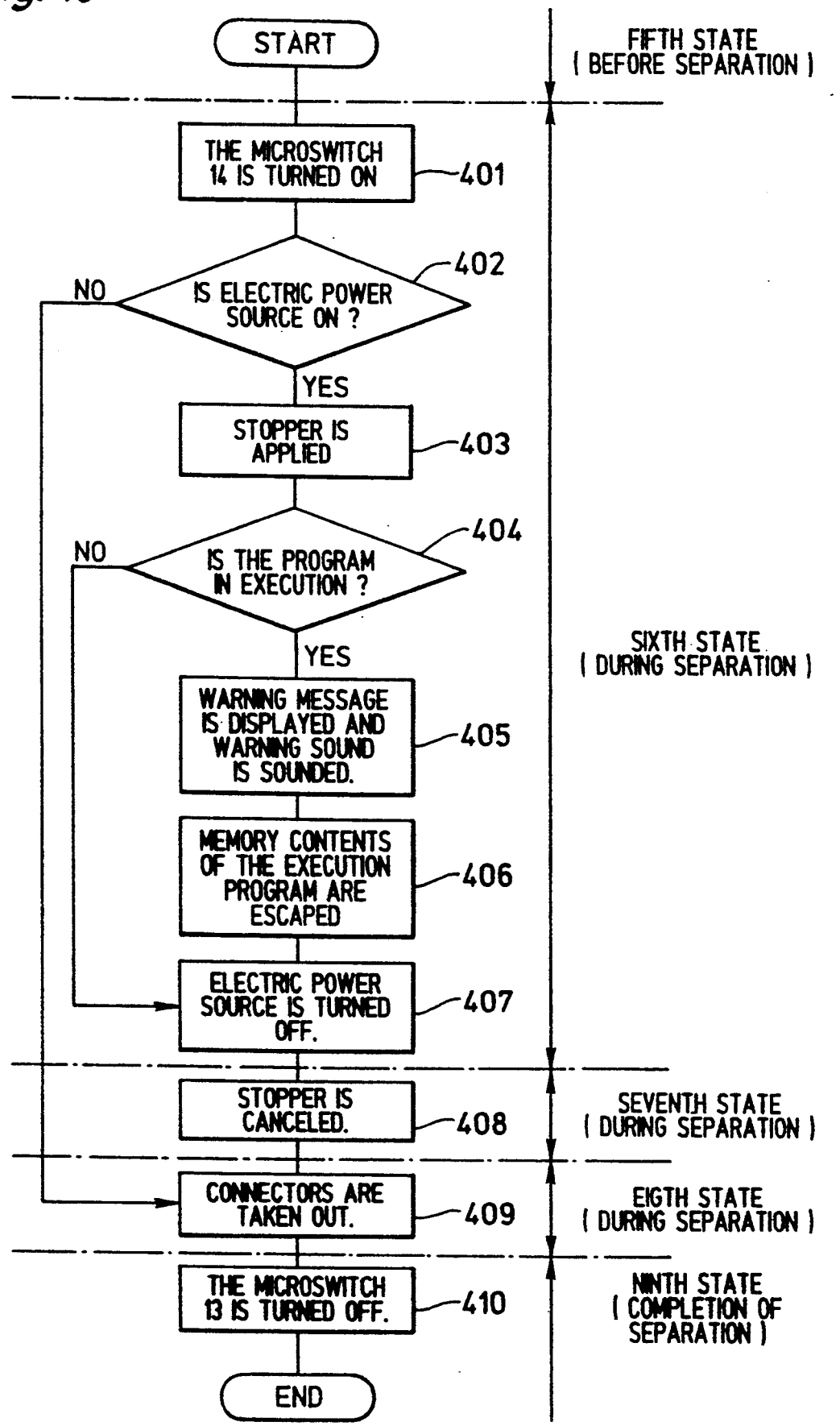
FIG. 16 is a flowchart showing a procedure for separating the personal computer from the station.

FIG. 14 and FIG. 15 are cross sectional views showing a procedure for separating the personal computer 2 from the station 1, and FIG. 16 is a flowchart of a procedure for separating the personal computer 2 from the station 1. The fifth state shown in FIG. 14(a) is the same as the fourth state shown in FIG. 12(d). And when the state proceed to the sixth state shown in FIG. 14(b),the fastening member 55 is pushed downward to allow the microswitch 14 to be switched to a state of 0N (step 401). In the case that the electric power source of the personal computer 2 is turned on when this microswitch 14 is switched to the state of ON (step 402), the stopper portion becomes locked (step 403). Next, the control unit 38 investigate whether the program is under execution or not (step 404) by an input signal of this microswitch 14, and when it is under execution, a warning message is displayed on the display unit 36, and a warning sound is generated from the speaker 37 (step 405). And let the memory contents of the program under execution temporally stored to a hard disk drive or the like (step 406), and the electric power source of the personal computer 2 is cut after completion of temporal storage (step 407). On the other hand, in the case that the program is not executed when the input signal of the microswitch 14 is detected by the control unit 38, the electric power source of the personal computer 2 is immediately cut. And in the seventh state shown in FIG. 14(c), the locked state of the stopper portion is canceled (step 408). Next, when the state becomes to the eighth state shown in FIG. 15(d), the station side connector 12 is separated from the personal computer side connector 33 (step 409). And in the ninth state shown in FIG. 15(e), the personal computer 2 is separated from the station 1. This separation action allows the microswitch 34 to be switched to a state of OFF (step 410).

Finally, as another example according to the present invention, an example in which the fastening member 55 which is the connector locking portion and the microswitch 14 which is the third detecting means are not used is given. In this example, by the stopper 19 is always made to be in the locked state during the connector is connected, fixing of the station 1 to the personal computer 2 is carried out only by the stopper portion 20. In addition, a switch which is a substitute for the microswitch 14 is newly provided, and separating action of the personal computer 2 is started by making this switch to be a connected state.

INDUSTRIAL APPLICABILITY

As explained above in detail, according to the docking system of the present invention, the electric power source is automatically cut even if the electric power source of the personal computer is not cut when the personal computer is placed on the station. Further, when a program is executed, the memory contents of the program are temporally stored to a hard disk drive or the like before cutting the electric power source, and the electric power source is cut after completion of temporal storage. During this cutting process of the electric power source, the stopper portion becomes in a locked state, and the connector is never connected before completion of cutting of the electric power source. After completing disconnection of the electric power source, the locked state of the stopper portion is canceled, so that the connector can be connected. When the connector is connected, the electric power source is connected again. In addition, the memory contents of the program under execution which are temporally stored to the hard disk drive or the like can be restored after connection of the connector. Owing to this restoration, execution of the same program can be reopened from the middle of operation.

Next, the electric power source of the personal computer or the like is automatically cut even if the electric power source if not cut when the personal computer is separated from the station. Further, when a program is executed, the memory contents of the program are temporally stored to a hard disk drive or the like before cutting the electric power source, and the electric power source is cut after completion of temporal storage. During this cutting processing of the electric power source, the stopper portion becomes in a locked state, and the connection of the connector is never canceled before completion of cutting of the electric power source. After completion of cutting of the electric power source, the locked state of the stopper portion is canceled, so that the connection of the connector can be can sled. And the memory contents of the program which are temporally stored to the hard disk drive or the like can be restored after the electric power source of the personal computer is connected again after separation. Owing to this restoration, execution of the same program can be reopened from the middle of operation.

I claim:

1. A docking system having a personal computer provided with a personal computer side connector and a personal computer side electric power source portion and a station provided with a station side connector and a station side electric power source portion, comprising:

(a) a first detecting means for detecting combination states of said personal computer and said station;
   (b) a second detecting means for detecting separating operation of said personal computer from said station;
   (c) a combination holding means for holding a combination state of said personal computer side connector and said station side connector;
   (d) a switching means for switching said personal computer side electric power source portion to said station side electric power source portion;
   (e) a third detecting means for detecting a state of placement of said personal computer on said station; and
   (f) a control unit, coupled to the first, second and third detecting means, the combination holding means, and to the switching means, which;
      (1) cuts said personal computer side electric power source after performing backup processing of an execution program when said personal computer side electric power source portion is in a conductive state when said third detecting means detects a state of placement;
      (2) supplies electric power from said station side electric power source portion to said personal computer by means of said switching means when said first detecting means detects a state of said station side connector being combined with said personal computer side connector; and
      (3) cuts the electric power source after performing backup processing of an execution program when said personal computer is in an actuation state when said second detecting means detects separating operation of said personal computer.

2. The docking system according to claim 1 wherein a locking means for preventing or fixing combination of said personal computer side connector and said station side connector is further provided.

3. The docking system according to claim 2 wherein said locking means prevents combination of said personal computer side connector and said station side connector when the electric power source is connected to said personal computer when said second detecting means is switched to ON state, and fixes combination of said personal computer side connector and said station side connector when the electric power source is connected to said personal computer when said second detecting means is switched to ON state.

4. The docking system according to any one of claims 2, 3 or 1 wherein said personal computer is formed to have a rectangular cross section, and said station is formed to have an L-shaped cross section by means of a mounting wall and a mounting surface, to form a box configuration when docking said personal computer with said station.

5. The docking system according to claim 4 wherein said personal computer side connector is provided at a rear end surface of said personal computer, said station side connector is provided at said mounting wall of the station, and said personal computer side connector is electrically connected with said station side connector when said personal computer and said station form a box configuration.

6. The docking system according to claim 5 wherein connection of said personal computer side connector with said station side connector is performed by sliding said personal computer from a position where said personal computer is placed on said mounting surface of the station toward said mounting wall of the station.

7. The docking system according to claim 6 wherein said combination holding means is provided with a first engaging member which is formed at said mounting surface of the station, and a second engaging member which is formed at the reverse surface of said personal computer and engages with said first engaging member.

8. The docking system according to claim 7 wherein said first engaging member is constituted by a fastening member projecting from said mounting surface of the station, and said second engaging member is constituted by a fastening groove which is formed at the reverse surface of said personal computer to receive said fastening member.

9. The docking system according to claim 8 wherein a guide projection is formed at said mounting surface of the station in order to allow said personal computer to slide toward the wall surface of said station, and a guide groove corresponding to said guide groove is formed at the reverse side of said personal computer.

10. The docking system according to claim 8 wherein said second detecting means becomes ON state when said fastening member is pushed by pressure to cancel a holding state of the connector.

11. The docking system according to claim 9 wherein said third detecting means is provided at the bottom portion of said guide groove, which becomes ON state when said guide projection of the station is inserted into said guide groove of the personal computer.

12. The docking system according to claim 4 wherein said first detecting means is provided at said mounting wall of the station.

13. In a docking system having a personal computer provided with a personal computer side connector and a personal computer side electric power source portion and a station provided with a station side connector and a station side electric power source portion, a first detecting means for detecting combination states of said personal computer and said station, a second detecting means for detecting separating operation of said personal computer from said station, a combination holding means for holding a combination state of said personal computer side connector and said station side connector, a switching means for switching said personal computer side electric power source portion to said station side electric power source portion, a third detecting means for detecting a state of placement of said personal computer on said station, and a control unit, coupled to the first, second and third detecting means, the combination holding means, and to the switching means, which cuts said personal computer side electric power source after performing backup processing of an execution program when said personal computer side electric power source portion is in a conductive state when said third detecting means detects a state of placement, supplies electric power from said station side electric power source portion to said personal computer by means of said switching means when said first detecting means detects a state of said station side connector being combined with said personal computer side connector, and cuts the electric power source after performing backup processing of an execution program when said personal computer is in an actuation state when said second detecting means detects separating operation of said personal computer; wherein said personal computer is formed to have a rectangular cross section, and said station is formed to have an L-shaped cross section by means of a mounting wall and a mounting surface, to form a box configuration when docking said personal computer with said station; and wherein said personal computer side connector is provided at a rear end surface of said personal computer, said station side connector is provided at said mounting wall of the station, and said personal computer side connector is electrically connected with said station side connector when said personal computer and said station form a box configuration; and wherein connection of said personal computer side connector with said station side connector is performed by sliding said personal computer from a position where said personal computer is placed on said mounting wall of the station toward said mounting wall of the station; and wherein said combination holding means is provided with a first engaging member which is formed at said mounting surface of the station, and a second engaging member which is formed at the reverse surface of said personal computer and engages with said first engaging member; and wherein said first engaging member is constituted by a fastening member projecting from said mounting surface of the station, and said second engaging member is constituted by a fastening groove which is formed at the reverse surface of said personal computer to receive said fastening member; and wherein a guide projection is formed at said mounting surface of the station in order to allow said personal computer to slide toward the wall surface of said station, and a guide groove corresponding to said guide groove is formed at the reverse side of said personal computer, a method comprising the steps of:

(a) placing said personal computer on said mounting surface of the station to insert said guide projection of the station into said guide groove of the personal computer, and (b) connecting said personal computer side connector with said station side connector by sliding said personal computer toward said mounting wall of the station by maintaining placement of said personal computer on said station.

14. The docking method according to claim 13 wherein said third detecting means becomes ON state by means of said guide projection inserted into said guide groove in said first step, and said first detecting means becomes ON state by means of said personal computer slided toward said mounting wall of the station in said second step.

15. In a docking system having a personal computer provided with a personal computer side connector and a personal computer side electric power source portion and a station provided with a station side connector and a station side electric power source portion, a first detecting means for detecting combination states of said personal computer and said station, a second detecting means for detecting separating operation of said personal computer from said station, a combination holding means for holding a combination state of said personal computer side connector and said station side connector, a switching means for switching said personal computer side electric power source portion to said station side electric power source portion, a third detecting means for detecting a state of placement of said personal computer on said station, and a control unit, coupled to the first, second and third detecting means, the combination holding means, and to the switching means, which cuts said personal computer side electric power source after performing backup processing of an execution program when said personal computer side electric power source portion is in a conductive state when said third detecting means detects a state of placement, supplies electric power from said station side electric power source portion to said personal computer by means of said switching means when said first detecting means detects a state of said station side connector being combined with said personal computer side connector, and cuts the electric power source after performing backup processing of an execution program when said personal computer is in an actuation state when said second detecting means detects separating operation of said personal computer; wherein said personal computer is formed to have a rectangular cross section, and said station is formed to have an L-shaped cross section by means of a mounting wall and a mounting surface, to form a box configuration when docking said personal computer with said station; and wherein said personal computer side connector is provided at a rear end surface of said personal computer, said station side connector is provided at said mounting wall of the station, and said personal computer side connector is electrically connected with said station side connector when said personal computer and said station form a box configuration; and wherein connection of said personal computer side connector with said station side connector is performed by sliding said personal computer from a position where said personal computer is placed on said mounting wall of the station toward said mounting wall of the station; and wherein said combination holding means is provided with a first engaging member which is formed at said mounting surface of the station, and a second engaging member which is formed at the reverse surface of said personal computer and engages with said first engaging member; and wherein said first engaging member is constituted by a fastening member projecting from said mounting surface of the station, and said second engaging member is constituted by a fastening groove which is formed at the reverse surface of said personal computer to receive said fastening member; and wherein a guide projection is formed at said mounting surface of the station in order to allow said personal computer to slide toward the wall surface of said station, and a guide groove corresponding to said guide groove is formed at the reverse side of said personal computer, a docking cancellation method comprising the steps of:

(a) separating said fastening member from said fastening groove of the personal computer by pushing said fastening member of the station by pressure;
(b) canceling connection of said personal computer side connector with said station side connector by sliding said personal computer in a direction separating from said mounting wall of the station; and
(c) separating said guide projection of the station from said guide groove of the personal computer to separate said personal computer from said station.

16. The docking cancellation method according to claim 15 wherein said second detecting means becomes ON state by means of said fastening member pushed by pressure in said first step, said first detecting means becomes OFF state by sliding the personal computer in a direction separating from said mounting wall of the station in said second step, and said third detecting means becomes OFF state by separating said guide projection from said guide groove.

* * * * *